(12) United States Patent
King et al.

(10) Patent No.: US 9,579,847 B2
(45) Date of Patent: Feb. 28, 2017

(54) THERMOPLASTIC INDUCTION-WELDING SYSTEMS

(71) Applicants: Jerry L. King, Williamstown, WV (US); Charles Furr, Summerfield, OH (US)

(72) Inventors: Jerry L. King, Williamstown, WV (US); Charles Furr, Summerfield, OH (US)

(73) Assignee: MAGNUM MAGNETICS CORPORATION, Marietta, OH (US)

( * ) Notice: Subject to any disclaimer, the term of this patent is extended or adjusted under 35 U.S.C. 154(b) by 197 days.

(21) Appl. No.: 14/337,370

(22) Filed: Jul. 22, 2014

(65) Prior Publication Data

US 2015/0020977 A1  Jan. 22, 2015

Related U.S. Application Data

(60) Provisional application No. 61/857,169, filed on Jul. 22, 2013.

(51) Int. Cl.
| | |
|---|---|
| *B29C 65/36* | (2006.01) |
| *B29C 65/48* | (2006.01) |
| *B29C 65/50* | (2006.01) |
| *B29C 65/00* | (2006.01) |
| *B29D 23/00* | (2006.01) |

(Continued)

(52) U.S. Cl.
CPC ....... *B29C 65/3612* (2013.01); *B29C 65/3696* (2013.01); *B29C 65/4815* (2013.01); *B29C 65/4875* (2013.01); *B29C 65/4885* (2013.01); *B29C 65/5057* (2013.01); *B29C 66/1122* (2013.01); *B29C 66/1222* (2013.01); *B29C 66/1224* (2013.01); *B29C 66/5221* (2013.01); *B29C 66/52292* (2013.01); *B29C 66/73921* (2013.01); *B29C 65/3668* (2013.01); *B29C 66/71* (2013.01); *B29D 23/003* (2013.01); *B29K 2023/065* (2013.01); *B29K 2023/0633* (2013.01); *B29K 2105/0005* (2013.01);

(Continued)

(58) Field of Classification Search
CPC ............... B29C 65/361; B29C 65/3644; B29C 65/3672; B29D 32/003
See application file for complete search history.

(56) References Cited

U.S. PATENT DOCUMENTS

| | | | | |
|---|---|---|---|---|
| 4,416,713 A | * | 11/1983 | Brooks | ................. B29C 65/342 156/273.9 |
| 6,352,779 B1 | * | 3/2002 | Edwards | ............... E06B 3/9608 428/412 |

(Continued)

FOREIGN PATENT DOCUMENTS

JP          08277988 A  * 10/1996

*Primary Examiner* — Daniel McNally
(74) *Attorney, Agent, or Firm* — Vorys, Sater, Seymour and Pease LLP; William L. Klima

(57) ABSTRACT

A flexible ferromagnetic strip is used to induction-weld seams in polymer pipes. The strip is a blend of strontium ferrite, a surfactant, and an LDPE binder. A process to produce the profile is to mix the ingredients together followed by granulation and extrusion or calendering. The strip is used in conjunction with an induction coil sized to fit over a polymer pipe coupling containing the strip and separate segments of polymer pipe. The strip is heated by induction current induced by an electromagnetic field generated by the coil. The heated strip causes the polymer pipe segments to be thermoplastically welded together.

36 Claims, 3 Drawing Sheets

(51) Int. Cl.
  *B29L 23/00* (2006.01)
  *B29K 23/00* (2006.01)
  *B29K 105/00* (2006.01)
  *B29K 105/16* (2006.01)

(52) U.S. Cl.
  CPC .... *B29K 2105/16* (2013.01); *B29K 2105/258* (2013.01); *B29L 2023/22* (2013.01)

(56) References Cited

U.S. PATENT DOCUMENTS

2010/0179264 A1* 7/2010 Kimura ................ C08K 5/053
　　　　　　　　　　　　　　　　　524/387
2010/0295299 A1　11/2010 Ziu
2014/0008004 A1　1/2014 Dyksterhouse et al.
2014/0008907 A1　1/2014 Dyksterhouse et al.

* cited by examiner

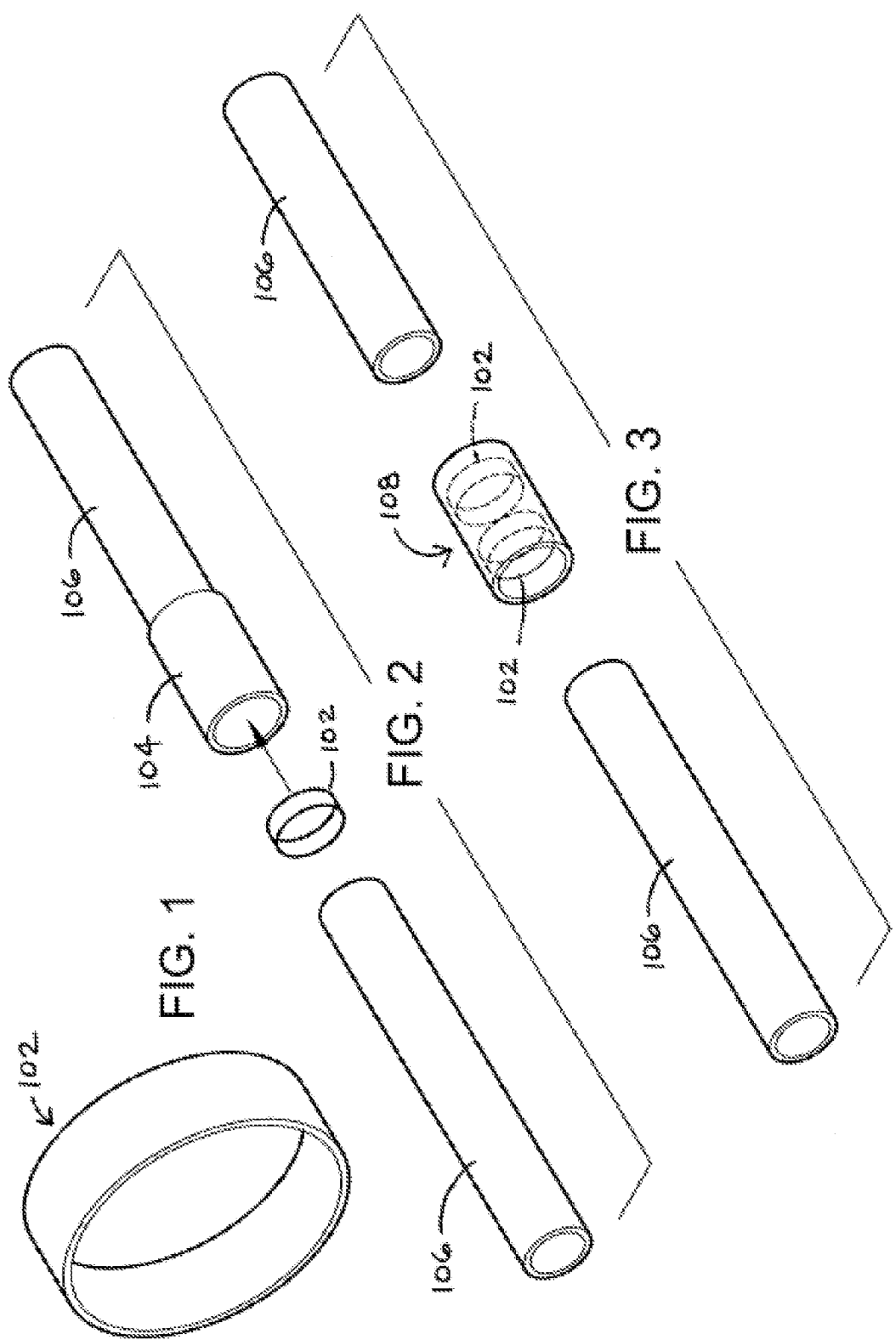

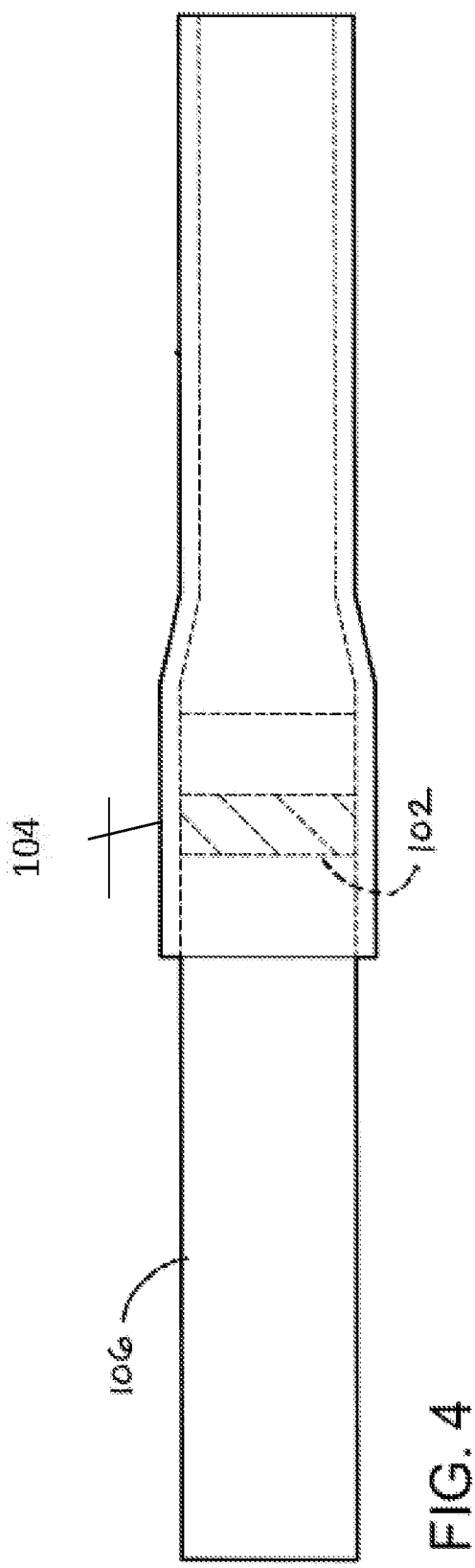
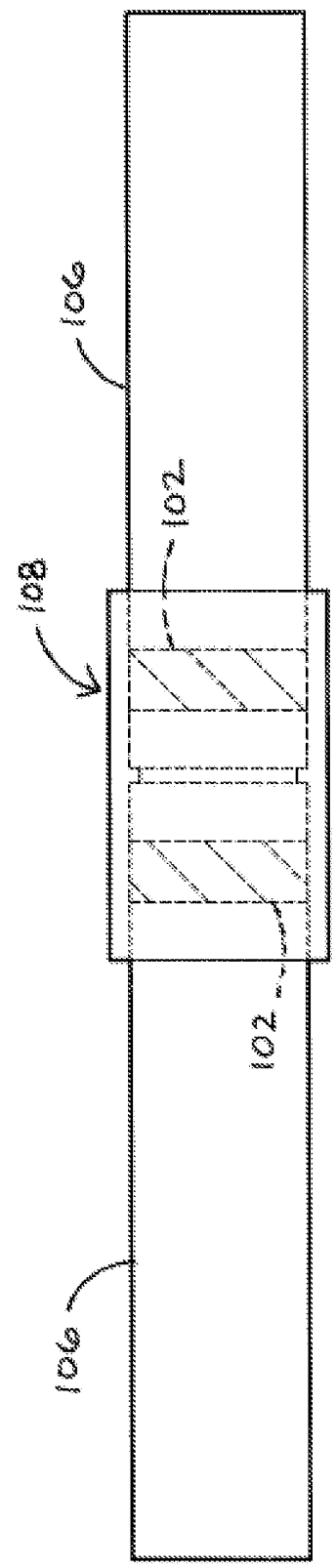
FIG. 4
FIG. 5

THERMOPLASTIC INDUCTION-WELDING SYSTEMS

CROSS-REFERENCE TO RELATED APPLICATIONS AND CLAIM OF PRIORITY

This application claims priority under 35 U.S.C. 119(e) of U.S. Provisional Application Ser. No. 61/857,169 filed Jul. 22, 2013, the contents of which are incorporated herein by reference in its entirety.

BACKGROUND

This invention relates to providing a system for improved thermoplastic induction-welding. More particularly, this invention relates to new compositions of matter that can be used to induction-weld seams in polymer pipes.

Since the earliest days of plumbing, water and drainage pipes have been made of metal and connected by welding or threading. Threaded pipes are difficult to assemble and manufacture, and welding requires substantial skill and risks causing fire or other property damage due to extreme heat and hazardous fumes. More recently, plastic pipes such as PVC (polyvinyl chloride), ABS (acrylonitrile butadience styrene), and PE (polyethylene) pipes have been implemented; however, these require volatile, messy, and toxic solvents in order to bond properly. Improvements in bonding methodology would be helpful to improve bond quality and to reduce installation hazards.

SUMMARY OF THE INVENTION

The present invention provides a system overcoming the above-mentioned problems, which can be used to induction-weld seams in polymer pipes. The invention further provides such a system that is efficient, inexpensive, and handy to use.

In accordance with one aspect, this invention provides a system for thermoplastic induction welding of polymer pipes, including a flexible ferromagnetic strip configured to fit within a coupling of a polymer pipe; an electromagnetic induction coil configured to surround said coupling; and a power supply electrically connectable to said electromagnetic induction coil and configured to cause said coil to generate an electromagnetic field upon energizing thereof by said power supply; whereby a flow of current is induced in said ferromagnetic strip to heat said strip, resulting in thermoplastic welding of separate polymer pipe segments located within the coupling.

In accordance with another aspect, this invention provides a flexible ferromagnetic strip configured to fit within a coupling of a polymer pipe to cause thermoplastic induction welding of separate polymer pipe segments within the coupling upon heating of the strip by electromagnetic induction current, the ferromagnetic strip containing a polymer binder combined with at least one surfactant and at least one ferromagnetic material.

BRIEF DESCRIPTION OF THE DRAWINGS

FIG. 1 shows a perspective view illustrating a flexible ferromagnetic strip, configured to assist inductive thermal welding of thermoplastic pipe fittings, according to a preferred embodiment of the present invention.

FIG. 2 shows an exploded perspective view, illustrating the flexible ferromagnetic strip adjacent a female end fitting of a thermoplastic pipe, according to the preferred embodiment of FIG. 1.

FIG. 3 shows an exploded perspective view, illustrating a pair of flexible ferromagnetic strips positioned within a double female pipe coupler, according to the preferred embodiment of FIG. 1.

FIG. 4 shows a side view, illustrating the female end fitting of FIG. 2 inductively welded to a thermoplastic pipe segment using the flexible ferromagnetic strip of FIG. 1.

FIG. 5 shows a side view, illustrating the double female pipe coupler of FIG. 3 inductively welded to a pair of thermoplastic pipe segments using the pair of flexible ferromagnetic strips of FIG. 3.

DETAILED DESCRIPTION OF THE INVENTION

Figure 8:
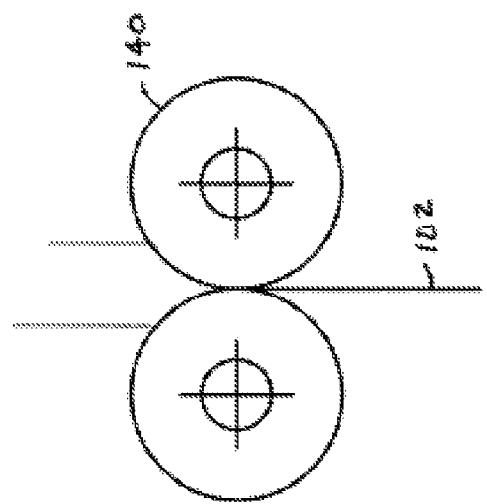
FIG. 8 shows a diagrammatic depiction, illustrating the formation of the flexible ferromagnetic strip using at least one calender, according to a preferred method of the present invention.

FIG. 1 shows a perspective view illustrating a preferred flexible ferromagnetic strip 102, preferably configured to assist the thermal welding of thermoplastic pipe fittings using an inductive process, according to an aspect of the present invention. FIG. 2 shows an exploded perspective view, illustrating the flexible ferromagnetic strip 102 adjacent a female coupling 104 of a thermoplastic pipe 106, according to the embodiment of FIG. 1. Flexible ferromagnetic strip 102 is preferably configured to fit within the circular bore of a thermoplastic pipe fitting, as shown in FIG. 2. Preferably, the coupler strip is firmly adhered to the interior of a plastic pipe such as a HDPE (high density polyethylene) pipe.

FIG. 3 shows an exploded perspective view, illustrating a pair of flexible ferromagnetic strips 102 engaged within a double female pipe coupler 108, according to the preferred embodiment of FIG. 1. Those skilled in the art will appreciate that, under appropriate circumstances, other coupling arrangements such as, for example, locating the ferromagnetic strip(s) at the outer face of the pipe, etc., may suffice.

FIG. 4 shows a side view, illustrating the female end fitting 104 of FIG. 2 inductively welded to thermoplastic pipe segment 106 using the flexible ferromagnetic strip 102 of FIG. 1. FIG. 5 shows a side view, illustrating the double female pipe coupler 108 of FIG. 3 inductively welded to a pair of thermoplastic pipe segments 106 using the pair of flexible ferromagnetic strips 102 of FIG. 3.

In a preferred embodiment of the present invention, a flexible ferromagnetic strip 102, consisting substantially of ferromagnetic particles embedded in a low-density polyethylene (LDPE) material, is preferably formed into a ring shape, as shown in FIG. 1. The ring is preferably embedded, or inserted, into the inner bore of a female coupling 104 of a thermoplastic pipe 106. A length of thermoplastic pipe 106 is then inserted into the joint and held into position, primarily by friction. An electromagnetic induction coil 120 (see FIG. 6) is preferably placed around the exterior of the joint, and an electromagnetic field is generated by the coil 120 by applying electric current at a predetermined frequency from a power supply 150. This field produces inductive heating in the ferromagnetic strip 102, which heating melts the surrounding thermoplastic pipe 106 segments, causing the segments to then fuse into a homogenous single length of pipe. This is similar to the effect of a chemical adhesion; however, it avoids the use of hazardous chemicals and tends to be stronger.

A preferred composition of ferromagnetic strip material is a low-density polyethylene (LDPE) binder combined with at least one surfactant and at least one ferromagnetic material. More specifically, the preferred material composition is a blend of strontium ferrite, a surfactant and an LDPE binder. Tables 1-5 below present preferred example compositions according to exemplary embodiments of the invention. A preferred ferromagnetic material is a sheet-grade strontium ferrite (sold under the tradename HM410 "Starbond" strontium ferrite powder by Hoosier Magnetics, Inc.) comprising "large" particle size.

TABLE 1

Example 1
Formula MF(S)1114 (50 Vol % Ferrite Powder)

| Material | Grade | Weight (lbs) | Weight % |
|---|---|---|---|
| LDPE | Marlex ® 1122B | 39.70 | 15.55 |
| BioRez | 66-116-A | 0.65 | 0.25 |
| Strontium Ferrite | 410 Ferrite Powder | 215 | 84.20 |
| Total | | 255.35 | 100.00 |

TABLE 2

Example 2
Formula MF(S)1113 (35 Vol % Ferrite Powder)

| Material | Grade | Weight (lbs)[1] | Weight % |
|---|---|---|---|
| LDPE | Marlex ® 1122B | 51.65 | 25.55 |
| BioRez | 66-116-A | 0.50 | 0.25 |
| Strontium Ferrite | 410 Ferrite Powder | 150 | 74.20 |
| Total | | 202.15 | 100.00 |

TABLE 3

Example 3
Formula MF(S)1106 (35 Vol % Ferrite Powder)

| Material | Grade | Weight (lbs)[1] | Weight % |
|---|---|---|---|
| HDPE | Hypel ® | 4.00 | 26.25 |
| BioRez | 66-116-A | 0.038 | 0.25 |
| Strontium Ferrite | 410 Ferrite Powder | 11.20 | 73.50 |
| Total | | 15.238 | 100.00 |

TABLE 4

Example 4
Formula MF(S)1107 (35 Vol % Ferrite Powder)

| Material | Grade | Weight (lbs)[1] | Weight % |
|---|---|---|---|
| HDPE | Hypel ® | 3.96 | 25.99 |
| BioRez | 66-116-A | 0.076 | 0.50 |
| Strontium Ferrite | 410 Ferrite Powder | 11.20 | 73.51 |
| Total | | 15.236 | 100.00 |

TABLE 5

Example 5
Formula MF(S)1112 (35 Vol % Ferrite Powder)

| Material | Grade | Weight (lbs)[1] | Weight % |
|---|---|---|---|
| HDPE | Novapol ® | 4.00 | 26.25 |
| BioRez | 66-116-A | 0.038 | 0.25 |
| Strontium Ferrite | 410 Ferrite Powder | 11.20 | 73.50 |
| Total | | 15.238 | 100.00 |

Upon reading this specification, those with ordinary skill in the art will now appreciate that, under appropriate circumstances, considering such issues as user preferences, cost, structural requirements, available materials, technological advances, etc., other material compositions such as, for example, MDPE binders, HDPE binders, etc., may suffice.

Through extensive experimental testing, applicant determined that a strontium ferrite loading of greater than or equal to about 50 vol % is most preferred. Applicant determined that a strontium ferrite loading of less than about 30 vol % fails to produce an adequate thermal weld and is therefore less preferred. The composition is also less preferred if the coupler strip is too brittle (that is, the sheet must wrap around a cylinder having an outer diameter of about 4½ inches). General mechanical properties of the preferred compositions are provided in Tables 6-8 below.

TABLE 7

| | 35 Vol % Ferrite | 50 Vol % Ferrite |
|---|---|---|
| Date | May 24, 2013 | May 24, 2013 |
| Date Made | May 24, 2013 | May 24, 2013 |
| Formula | MFS1113 | MFS1114 |
| Shore D | | |
| Br | | |
| Hc | | |
| Hcl | | |
| Bh max | | |
| Millage (") | .0864-.0991 | .0812-.1040 |
| Density | | |
| | Same Day | Same Day |
| Tensile Strength | 937 | 1080 |
| Elong @ Break | 6.4 | 2.5 |
| Yield Strength | 1007 | 1120 |
| Elong @ Yield | 5.3 | 2.5 |
| Stiffness | 190 | 448 |
| | 24 hr dwell | 24 hr dwell |
| Tensile Strength | | |
| Elong @ Break | | |
| Yield Strength | | |
| Elong @ Yield | | |
| Stiffness | #DIV/0! | #DIV/0! |
| Bend Test 4.5" Pipe | Pass | Pass |
| Binder Polymer | LDPE (Marlex) | LDPE (Marlex) |
| Surfactant | BioRez (.25%) | BioRez (.25%) |
| Mixer - Extruder | | |

TABLE 6

50 Vol % Ferrite

| | |
|---|---|
| Date | |
| Date Made | |
| Formula | MFS1114 |
| Thickness (") | 0.0617 |
| Shore D | 63 |

TABLE 6-continued

| 50 Vol % Ferrite | |
|---|---|
| Br | 1309 |
| Hc | 1350 |
| Hcl | 2155 |
| Bh max | 0.36 |
| Density | 2.98 |
| | Same Day |
| Tensile Strength | 1325 |
| Elong @ Break | 5.0 |
| Yield Strength | 1478 |
| Elong @ Yield | 4.7 |
| Stiffness | 314 |
| | 24 hr dwell |
| Tensile Strength | 1394 |
| Elong @ Break | 4.7 |
| Yield Strength | 1533 |
| Elong @ Yield | 4.2 |
| Stiffness | 365 |
| Bend Test 4.5" Pipe | Pass |
| Binder Polymer | LDPE (Marlex) |
| Mixer - Extruder | |

TABLE 8

| | 35 Vol % Ferrite | 35 Vol % Ferrite | 35 Vol % Ferrite |
|---|---|---|---|
| Date | | | |
| Hcl | | | |
| Bh max | | | |
| Millage (") | .050-.052 | .0490-.0510 | .037-0.483 |
| Density | 2.34 | 2.34 | 2.32 |
| | Same Day | Same Day | Same Day |
| Elong @ Yield | | | |
| Stiffness | #DIV/0! | #DIV/0! | #DIV/0! |
| | 24 hr dwell at 140 F. | 24 hr dwell at 140 F. | 24 hr dwell at 140 F. |
| Elong @ Yield | | | |
| Stiffness | #DIV/0! | #DIV/0! | #DIV/0! |
| Bend Test 4.5" Pipe | Pass | Pass | Pass |
| Binder Polymer | HDPE (Hypel) | HDPE (Hypel) | HDPE (Novapol) |
| Surfactant | BioRez (.25%) | BioRez (.50%) | BioRez (.25%) |
| Lab Mixer - Lab Mill | | | |

Figure 7:
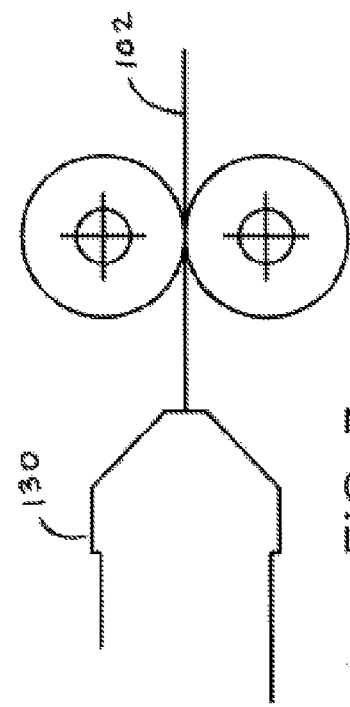
FIG. 7 shows a diagrammatic depiction, illustrating the formation of the flexible ferromagnetic strip using at least one extrusion process, according to a preferred method of the present invention.

Flexible ferromagnetic strip 102 is preferably formed using one of several preferred processes. FIG. 7 shows a diagrammatic depiction, illustrating at least one extruder 130 used to extrusion-form the flexible ferromagnetic strip 102, according to one preferred method of the present invention. FIG. 8 shows a diagrammatic depiction illustrating at least one calender or series of hard pressure rollers 140 used to calender-form the flexible ferromagnetic strip 102, according to another preferred method of the present invention. Preferred processes to produce the profile is to mix the ingredients together followed by granulation and extrusion (see FIG. 7) or calendering (see FIG. 8). Alternate preferred production processes utilize combinations of extrusion and calendering, as shown. Upon reading this specification, those skilled in the art will appreciate that, under appropriate circumstances, considering such issues as design preference, user preferences, marketing preferences, cost, structural requirements, available materials, technological advances, etc., other production arrangements such as, for example, molding, milling, co-molding, co-extrusion, etc., may suffice.

Applicant determined that better loading ferromagnetic material was achieved when LDPE is used. Furthermore, applicant determined that the resulting product was less brittle. The filler dispersing agent (surfactant) allows higher loadings of the strontium ferrite in polyethylene while maintaining good flexibility. The surfactant increases the toughness, tear strength, and elongation of the coupler strip/sheet. A preferred surfactant is an organic surfactant, preferably comprising a polyester resin such as BioRez® 66-116-A, commercially available from Advanced Images Resources, Alpharetta, Ga. Alternately preferably, the surfactant preferably comprises stearic acid. Alternately preferably, the surfactant comprises calcium stearate. Alternately preferably, the surfactant comprises at least one tackifying resin such as at least one abietic acid ester, at least one rosin ester, or at least one terpene phenolic resin. Such at least one rosin ester preferably comprises rosin esters sold under the trademark Foral® or Pentrex™. Alternately preferably, the surfactant comprises at least one styrene-acrylate copolymer such as Pliolite® AC-L. Alternately preferably, the surfactant comprises at least one acrylate copolymer resin such as Pliolite® LV72. Alternately preferably, the polymer binder comprises other thermoplastics or thermoplastic combinations.

Figure 6:
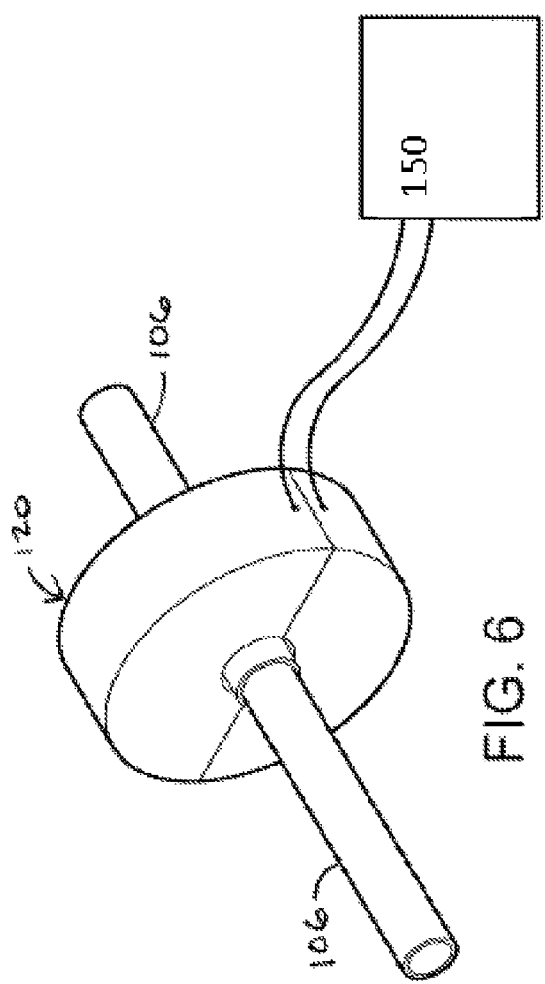
FIG. 6 shows a diagrammatic perspective view, illustrating an inductive coil used to induce inductive heating in the flexible ferromagnetic strip of FIG. 1.

FIG. 6 shows a diagrammatic perspective view, illustrating an inductive coil 120 used to induce inductive heating in the flexible ferromagnetic strip 102 of FIG. 1. The blend of strontium ferrite, LDPE, and BioRez® melts by induction heating at the correct temperature to fuse with HDPE pipe. For induction heating to be effective, the volume of strontium ferrite in the formulation needs to be at least 30% by volume. Applicant's preferred induction heating formulation contains from 30-75% by volume of ferrite powder. An optimum formulation of 50 vol % strontium ferrite was formulated with good flexibility In testing, successful joining of pipe members was achieved using an induction frequency of about 400 Hz, which was observed to produce melt temperatures within the region of the ferromagnetic material of about 300-degree Fahrenheit (F). In an alternate preferred embodiment of the present system, the ferromagnetic material is preferably set into an additional wire mesh located inside the coupler to control field, flow, and physical position of the thermoplastic forming the pipe fitting.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system for thermoplastic induction welding of polymer pipes, comprising:
 a flexible ferromagnetic strip configured to fit within a coupling of a polymer pipe, the flexible ferromagnetic strip comprising at least one ferromagnetic material combined with a polymer material having at least one surfactant selected to allow a higher loading of the ferromagnetic material in the polymer material while maintaining flexibility;
 an electromagnetic induction coil configured to surround said coupling; and a power supply electrically connectable to said electromagnetic induction coil and configured to cause said coil to generate an electromagnetic field upon energizing thereof by said power supply, whereby a flow of current is induced in said ferromagnetic strip to heat said strip, resulting in thermoplastic welding of separate polymer pipe segments located within said coupling.

2. The system as set forth in claim 1, wherein said flexible ferromagnetic strip comprises ferromagnetic particles embedded in a polyethylene material.

3. The system as set forth in claim 2, wherein said ferromagnetic material comprises strontium ferrite.

4. The system as set forth in claim 3, wherein said ferromagnetic material has a strontium ferrite loading of greater than 30 vol %.

5. The system as set forth in claim 4, wherein said ferromagnetic material has a strontium ferrite loading of greater than or equal to about 50 vol %.

6. The system as set forth in claim 2, wherein said polymer binder comprises low-density polyethylene (LDPE).

7. The system as set forth in claim 1, wherein said surfactant comprises at least one tackifying resin.

8. The system as set forth in claim 7, wherein said surfactant comprises at least one abietic acid ester.

9. The system as set forth in claim 7, wherein said surfactant comprises at least one rosin ester.

10. The system as set forth in claim 7, wherein said surfactant comprises at least one terpene phenolic resin.

11. The system as set forth in claim 1, wherein said surfactant comprises an organic surfactant.

12. The system as set forth in claim 11, wherein said organic surfactant comprises a polyester resin.

13. The system as set forth in claim 1, wherein said surfactant comprises stearic acid.

14. The system as set forth in claim 1, wherein said surfactant comprises calcium stearate.

15. The system of claim 1, wherein said surfactant comprises at least one styrene-acrylate copolymer.

16. The system of claim 1, wherein said surfactant comprises at least one acrylate copolymer.

17. A flexible ferromagnetic strip configured to fit within a coupling of a polymer pipe to cause thermoplastic induction welding of separate polymer pipe segments within said coupling upon heating of said strip by electromagnetic induction current, said ferromagnetic strip comprising a polymer binder having a surfactant combined with at least one ferromagnetic material, the at least one surfactant selected to allow a higher loading of the ferromagnetic material in the polymer material while maintaining flexibility.

18. The flexible ferromagnetic strip as set forth in claim 17, wherein said ferromagnetic material comprises strontium ferrite.

19. The flexible ferromagnetic strip as set forth in claim 18, wherein said ferromagnetic material has a strontium ferrite loading of greater than 30 vol %.

20. The flexible ferromagnetic strip as set forth in claim 19, wherein said ferromagnetic material has a strontium ferrite loading of greater than or equal to about 50 vol %.

21. The flexible ferromagnetic strip as set forth in claim 17, wherein said surfactant comprises at least one tackifying resin.

22. The flexible ferromagnetic strip as set forth in claim 21, wherein said surfactant comprises at least one abietic acid ester.

23. The flexible ferromagnetic strip as set forth in claim 21, wherein said surfactant comprises at least one rosin ester.

24. The flexible ferromagnetic strip as set forth in claim 21, wherein said surfactant comprises at least one terpene phenolic resin.

25. The flexible ferromagnetic strip as set forth in claim 17, wherein said surfactant comprises an organic surfactant.

26. The flexible ferromagnetic strip as set forth in claim 25, wherein said organic surfactant comprises a polyester resin.

27. The flexible ferromagnetic strip as set forth in claim 17, wherein said polymer binder comprises low-density polyethylene (LDPE).

28. The flexible ferromagnetic strip as set forth in claim 17, wherein said surfactant comprises stearic acid.

29. The flexible ferromagnetic strip as set forth in claim 17, wherein said surfactant comprises calcium stearate.

30. The flexible ferromagnetic strip of claim 17, wherein said surfactant comprises at least one styrene-acrylate copolymer.

31. The flexible ferromagnetic strip of claim 17, wherein said surfactant comprises at least one acrylate copolymer.

32. A system for thermoplastic induction welding of polymer pipes, comprising: a flexible ferromagnetic strip configured to fit within a coupling of a polymer pipe, the flexible ferromagnetic strip comprising at least one ferromagnetic material combined with a polyethylene binder having at least one surfactant; an electromagnetic induction coil configured to surround said coupling; and a power supply electrically connectable to said electromagnetic induction coil and configured to cause said coil to generate an electromagnetic field upon energizing thereof by said power supply, whereby a flow of current is induced in said ferromagnetic strip to heat said strip, resulting in thermoplastic welding of separate polymer pipe segments located within said coupling.

33. A system for thermoplastic induction welding of polymer pipes, comprising: a flexible ferromagnetic strip configured to fit within a coupling of a polymer pipe; an electromagnetic induction coil configured to surround said coupling; and a power supply electrically connectable to said electromagnetic induction coil and configured to cause said coil to generate an electromagnetic field upon energizing thereof by said power supply, wherein said flexible ferromagnetic strip further comprises a surfactant, wherein said surfactant comprises at least one tackifying resin, and wherein said surfactant comprises at least one abietic acid ester, whereby a flow of current is induced in said ferromagnetic strip to heat said strip, resulting in thermoplastic welding of separate polymer pipe segments located within said coupling.

34. A system for thermoplastic induction welding of polymer pipes, comprising: a flexible ferromagnetic strip configured to fit within a coupling of a polymer pipe; an electromagnetic induction coil configured to surround said coupling; and a power supply electrically connectable to said electromagnetic induction coil and configured to cause said coil to generate an electromagnetic field upon energizing thereof by said power supply, wherein said flexible ferromagnetic strip further comprises a surfactant, wherein said surfactant comprises at least one tackifying resin, and wherein said surfactant comprises at least one terpene phenolic resin, whereby a flow of current is induced in said ferromagnetic strip to heat said strip, resulting in thermoplastic welding of separate polymer pipe segments located within said coupling.

35. A flexible ferromagnetic strip configured to fit within a coupling of a polymer pipe to cause thermoplastic induction welding of separate polymer pipe segments within said coupling upon heating of said strip by electromagnetic induction current, said ferromagnetic strip comprising a polymer binder combined with at least one ferromagnetic material, wherein said flexible ferromagnetic strip further comprises at least one surfactant, and wherein said surfactant comprises at least one abietic acid ester.

36. A flexible ferromagnetic strip configured to fit within a coupling of a polymer pipe to cause thermoplastic induction welding of separate polymer pipe segments within said coupling upon heating of said strip by electromagnetic induction current, said ferromagnetic strip comprising a polymer binder combined with at least one ferromagnetic material, wherein said flexible ferromagnetic strip further comprises at least one surfactant, and wherein said surfactant comprises at least one terpene phenolic resin.

* * * * *